(12) United States Patent
Krishnan et al.

(10) Patent No.: US 7,965,879 B2
(45) Date of Patent: Jun. 21, 2011

(54) SYSTEM AND METHOD FOR DETECTING STRIPE ARTIFACTS IN MIP RENDERED IMAGES

(75) Inventors: Smita Krishnan, Yardley, PA (US); Min Xie, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 783 days.

(21) Appl. No.: 12/040,244

(22) Filed: Feb. 29, 2008

(65) Prior Publication Data
US 2009/0028399 A1    Jan. 29, 2009

Related U.S. Application Data

(60) Provisional application No. 60/952,069, filed on Jul. 26, 2007.

(51) Int. Cl.
G06K 9/00 (2006.01)
(52) U.S. Cl. .......................... 382/128; 382/131; 382/132
(58) Field of Classification Search .................. 382/128, 382/131, 132, 254, 275
See application file for complete search history.

(56) References Cited

U.S. PATENT DOCUMENTS

| | | | | |
|---|---|---|---|---|
| 6,058,218 | A  * | 5/2000 | Cline | 382/254 |
| 6,493,569 | B2 * | 12/2002 | Foo et al. | 600/410 |
| 6,983,182 | B2 * | 1/2006 | Mistretta | 600/425 |
| 7,636,461 | B2 * | 12/2009 | Spies et al. | 382/128 |

* cited by examiner

*Primary Examiner* — Tom Y Lu
(74) *Attorney, Agent, or Firm* — Peter L. Kendall (57) ABSTRACT

A method for efficiently rendering a chessboard artifact free Maximum intensity projection (MIP) image is disclosed is disclosed. MIP is a widely used volumetric rendering technology in medical diagnostic imaging. When a volume dataset containing wideband noise is rendered using MIP, the resultant MIP image can show chessboard or stripe like artifacts. A method is disclosed for automatically detecting stripe artifacts present in the MIP rendered images and to determine whether suitable mitigation algorithms need to be applied during rendering. This automatic detection method eliminates the need for human review of images to determine whether mitigation is required, and thus speeds the overall process.

20 Claims, 11 Drawing Sheets

SYSTEM AND METHOD FOR DETECTING STRIPE ARTIFACTS IN MIP RENDERED IMAGES

CROSS-REFERENCE TO RELATED APPLICATIONS

This is a non-provisional patent application of pending U.S. provisional patent application Ser. No. 60/952,069, filed Jul. 26, 2007, by Smita Krishnan et al., titled "Method to Detect Stripe Artifacts in MIP Rendered Images," the entirety of which application is incorporated by reference herein.

FIELD OF THE DISCLOSURE

The disclosure relates to systems and methods for minimizing artifacts in digital medical images, and more particularly to systems and methods for automatically identifying stripe artifacts in maximum intensity projection (MIP) rendered medical images so that an appropriate artifact mitigation algorithm can be applied to minimize the artifacts.

BACKGROUND OF THE DISCLOSURE

Medical imaging techniques provide doctors and medical technicians with valuable data for patient diagnosis and care. Various imaging techniques include cardiac angiography, peripheral angiography, radiography, computed tomography (CT), positron emission tomography (PET) and magnetic resonance imaging (MRI). All of these imaging techniques produce medical images that are then studied by medical personnel in making diagnoses. When these imaging techniques produce images, the images have a dataset of pixels or voxels that can be manipulated to increase image quality. It will be appreciated that higher image quality will lead to a more accurate diagnosis. The images produced by the above-listed techniques can be rendered by maximum intensity projection (MIP), which is a widely used volumetric rendering technique for medical diagnostic imaging. MIP is commonly used to extract vascular structures from medical CT or MRI data sets, such as with angiography.

With MIP, at each pixel the highest sample value encountered along the corresponding viewing ray is determined. There are several MIP rendering methods, including Shear-warp, Splatting, and Raycast based methods. Among these models, the Ray Cast based methods produce the best image quality. With Ray Cast methods, for every pixel in the output rendered image, a ray is shot into the volume at a certain viewing direction. This ray is sampled along the volume at constant intervals, which are determined from the zoom factor. The maximum sample value along the ray is then calculated and stored in the rendered image pixel. This process is repeated until all the rays from every pixel in the output image are cast and the maximum along each of them is calculated.

In order to sample the volume along each ray, a suitable interpolation method, such as a tri-linear interpolation method, is often used. The ti-linear interpolation method makes use of linearly weighted averages of eight neighboring voxels to calculate the intensity of a sample. A voxel ("volumetric pixel" or 3-D pixel) is a volume element, representing a value on a regular grid in three dimensional space. Voxels are analogous to pixels, which represent 2-D image data. Voxels are frequently used in the visualization and analysis of medical and scientific data. Voxels are the smallest distinguishable box-shaped part of a 3-D image, which is obtained by multiplying the pixel area by the slice thickness. The weight of each neighboring voxel is determined by its distance from the sample value. The closer the neighboring voxel is to the sample, the greater its weight.

Due to the presence of wide band noise in the volume data, the maximum sample values of rays that lie near or on the voxel grid are likely to be influenced by the noise and thus will have a higher intensity value as compared to those rays that lie in the middle of the voxel grids. This difference results in the formation of stripes in the MIP images. The width of the stripe depends on the zoom factor or the ratio of voxel distance and the pixel distance. The stripes can be formed both horizontally and vertically, which results in the chessboard like pattern. Since the noise is wideband in nature, there is no effective method to pr-filter the volume data set without damaging the signal components and lowering MIP image resolution.

A technique for eliminating chessboard artifacts and/or stripe like artifacts is described in detail in pending U.S. patent application Ser. No. 11/771,329, filed Jun. 29, 2007 by Smita Krishnan et al., entitled "Systems and Methods of Image Rendering from Datasets," the entirety of which application is incorporated herein by reference. This chessboard mitigation method introduces certain localized high frequency loss. Thus, in order to maintain a desired high fidelity of a MIP image the mitigation method should only be applied when the stripe or chessboard artifacts in the regular MIP image exist.

Currently artifact detection is performed purely by visual examination. However, this requires an end user interaction, which does not fit well into clinical workflow. Thus, it would be desirable to provide a method to automatically detect whether stripe-like chessboard patterns exist in the rendered MIP images.

SUMMARY OF THE DISCLOSURE

A computer-implemented method is disclosed for identifying and eliminating chessboard artifacts in MIP images. The method may comprise: accessing volumetric data representative of a medical image volume, the volumetric data having random noise; forming a 3-D voxel grid from the volumetric data; rendering non-mitigated MIP images of the volumetric data along three major axes; calculating an estimated stripe period (ESP) based on a zoom factor of the rendered images; computing average row and column vectors by calculating the mean of each row and column of each MIP image, respectively; performing a 1D Fourier transform on average row vectors and average column vectors; and analyzing the resulting frequency spectrum within a predetermined window period to determine if a maximum power within the predetermined window period is greater than a threshold value, wherein the predetermined window period is based on the ESP; and identifying the MIP image as containing a chessboard artifact if the maximum power is greater than the threshold value.

Further, if the maximum power within the predetermined window period is not greater than the threshold value, the method may also comprise the following steps: applying the mitigation algorithm to render reference-mitigated MIP images of the volume data along three manor axes; computing average row and column vectors by calculating the mean of each row and column of each reference-mitigated MIP image, respectively; calculating correlated differences between average row and column intensities of the mitigated and non-mitigated MIP images; performing a 1-D Fourier transform on the correlated differences and analyzing the frequency spectrum within the predetermined window period; analyzing whether a maximum power of the difference in intensity spectrums is greater than the threshold value; and identifying the MIP image as containing a chessboard artifact if the difference in intensity spectrums is greater than the threshold value.

A system is also disclosed for identifying and eliminating chessboard artifacts in MIP images, comprising: means for accessing volumetric data representative of a medical image volume, the volumetric data having random noise; means for forming a 3-D voxel grid from the volumetric data; means for rendering non-mitigated MIP images of the volumetric data along three major axes; means for calculating an estimated stripe period (ESP) based on a zoom factor of the rendered images; means for computing average row and column vectors by calculating the mean of each row and column of each MIP image, respectively; means for performing a 1D Fourier transform on average row vectors and average column vectors; and means for analyzing the resulting frequency spectrum within a predetermined window period to determine if a maximum power within the predetermined window period is greater than a threshold value, wherein the predetermined window period is based on the ESP; and means for identifying the MIP image as containing a chessboard artifact if the maximum power is greater than the threshold value.

Further, if the maximum power within the predetermined window period is not greater than the threshold value, the system may further comprise: means for a applying the mitigation algorithm to render reference-mitigated MIP images of the volume data along three manor axes; means for computing average row and column vectors by calculating the mean of each row and column of each reference-mitigated MIP image, respectively; means for calculating correlated differences between average row and column intensities of the mitigated and non-mitigated MIP images; means for performing a 1-D Fourier transform on the correlated differences and analyzing the frequency spectrum within the predetermined window period; means for analyzing whether a maximum power of the difference in intensity spectrums is greater than the threshold value; and means for identifying the MIP image as containing a chessboard artifact if the difference in intensity spectrums is greater than the threshold value.

Also disclosed is a machine readable storage device tangibly embodying a series of instructions executable by the machine to perform a series of steps, the steps comprising: accessing volumetric data representative of a medical image volume, the volumetric data having random noise; forming a 3-D voxel grid from the volumetric data; rendering non-mitigated MIP images of the volumetric data along three major axes; calculating an estimated stripe period (ESP) based on a zoom factor of the rendered images; computing average row and column vectors by calculating the mean of each row and column of each MIP image, respectively; performing a 1D Fourier transform on average row vectors and average column vectors; and analyzing the resulting frequency spectrum within a predetermined window period to determine if a maximum power within the predetermined window period is greater than a threshold value, wherein the predetermined window period is based on the ESP; and identifying the MIP image as containing a chessboard artifact if the maximum power is greater than the threshold value.

Further, if the maximum power within the predetermined window period is not greater than the threshold value, the machine readable storage device may also comprise instructions for performing the following steps: applying the mitigation algorithm to render reference-mitigated MIP images of the volume data along three manor axes; computing average row and column vectors by calculating the mean of each row and column of each reference-mitigated MIP image, respectively; calculating correlated differences between average row and column intensities of the mitigated and non-mitigated MIP images; performing a 1-D Fourier transform on the correlated differences and analyzing the frequency spectrum within the predetermined window period; analyzing whether a maximum power of the difference in intensity spectrums is greater than the threshold value; and identifying the MIP image as containing a chessboard artifact if the difference in intensity spectrums is greater than the threshold value.

BRIEF DESCRIPTION OF THE DRAWINGS

The accompanying drawings illustrate preferred embodiments of the disclosure so far devised for the practical application of the principles thereof, and in which:

FIGS. 3A and 3B show MIP rendered images from synthesized noisy volume data.

FIGS. 4A and 4B are frequency plots of the MIP rendered images of FIGS. 3A and 3B, in which

FIGS. 5A and 5B show the average intensity of the MIP rendered image of FIG. 3A with artifacts.

FIGS. 8A through 8I show an exemplary MR leg MIP image, in which

DETAILED DESCRIPTION OF THE DISCLOSURE

Figure 1:
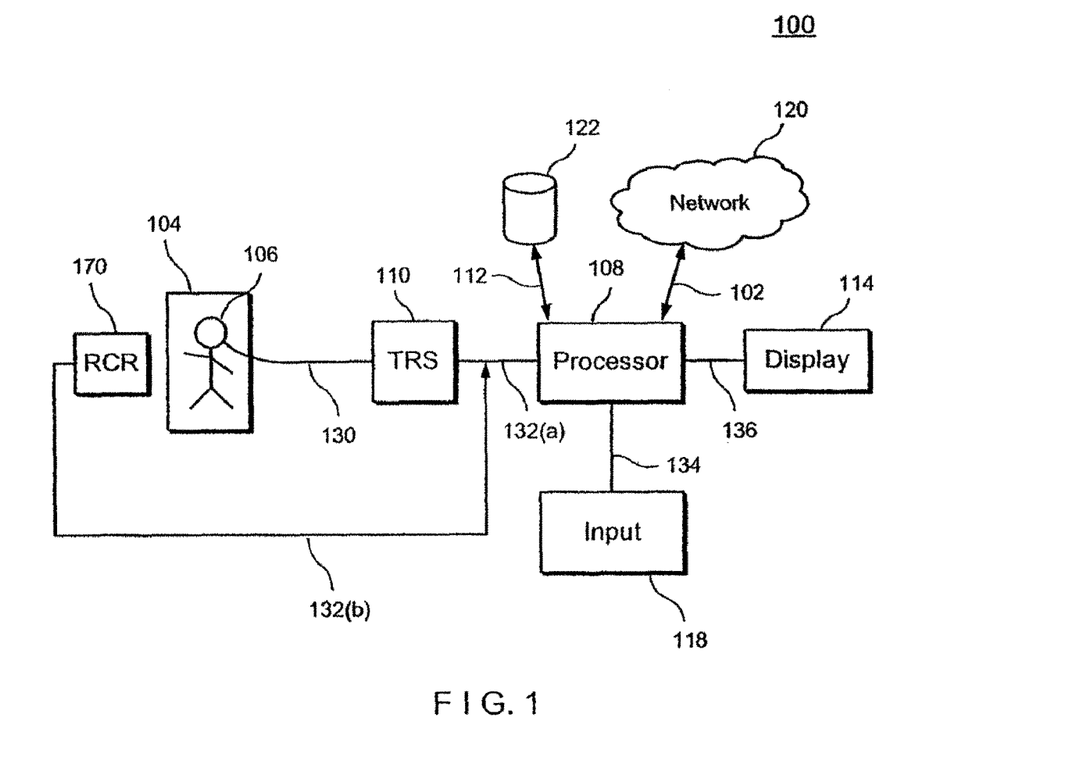
FIG. 1 shows a medical imaging system that may utilize the disclosed technique.

FIG. 1 shows an exemplary medical imaging system 100 that may utilize the disclosed method. System 100 includes a processing device 108, a display module 114, an input module 118, a transmitter module 110, remote storage module 122, network 120, patient 106, examination table 104, and receiver unit 170.

A patient 106 is supported by table 104. Transmitter unit, or module, or emitter unit, or module, 110 and receiver unit, or module, or detection unit, or module, 170 produce image data related to a patient 106. The transmission unit 110 generates imaging medium 130, which may be x-rays, positrons, high-frequency sound waves (ultrasound), or other imaging medium. The transmission unit 110 may be, for example, an x-ray emitting unit, such as an x-ray tube, and receiver unit 170 may be, for example, an x-ray detecting unit, such as an x-ray detector.

In an x-ray embodiment, the emitting unit, or module, 110 is adapted to emit x-rays 130 (identifying a plurality of x-ray signals) and may be, for example, an x-ray producing device that includes a source of electrons, a vacuum within which the electrons are accelerated, and an energy source that causes the electrons to be accelerated. The detection unit, or module, 170 is adapted to absorb and measure the emitted x-rays.

The imaging process may also be implemented using Computed Tomography (CT), originally known as computed axial tomography (CAT or CT scan), which uses digital geometry processing to generate a three dimensional image of internal features of an object from a large series of two-dimensional x-ray images taken around a single axis of rotation. An iodine dye, or other contrast material, may be used to make structures and organs easier to see on the CT pictures. The dye may be used to check blood flow, find tumors, and examine other problems or areas of interest. Positron emission tomography (PET) imaging may also be used. In PET imaging, a short-lived radioactive tracer isotope, which decays by emitting a positron, and which typically has been chemically incorporated into a metabolically active molecule, is injected into the patient. The radioactive decay of positrons is measured to generate an image.

Transmitter unit, or emitting unit, 110 and receiver unit, or detection unit, 170 are coupled to processor unit 108 via communication media 132(*a*) and 132(*b*), respectively, which are used to provide image data to processing unit 108. Communication media 132 (generally) are, for example, a USB bus, IEEE bus or other bi-directional communication medium that is capable of transmitting data, typically representing a one or more images in an electronic format.

Processor unit 108 is typically a system control unit that controls the operation of the entire system 100, performs image processing, and transmits the image data for display on the image display unit 114. Processor unit 108 typically includes a CPU and memory to perform the necessary data processing and storage functions for system 100.

Processing unit, or device, or module, or terminal, 108 is typically one or more computers, or other processing device (s), wireless processing device, personal computer (PC), desktop, notebook, information appliance and the like. The processing device typically includes processing and storage modules.

The image display unit, or module, 114 is coupled to processor unit 108 via bidirectional communication medium 136, which is typically a bus or wired connection or wireless connection. The display unit 114 is used to display the image data generated by the system 100. The display unit 114 may be, for example, a monitor, liquid crystal display (LCD), a plasma screen, a graphical user interface (GUI) or other module adapted to display output data typically by a representation of pixels. Input module 118 is coupled to processing unit 108 via bidirectional communication medium 134, which is typically a bus or wired connection or wireless connection. The input module 118 may include devices such as a keyboard, mouse, track ball and/or touch pad or any combination thereof.

The image display module 114 may be coupled to another CPU, processor, or computer, such as a desktop computer, or a laptop computer (not shown), and may also be coupled to a keyboard, a mouse, a track ball, or other input device (not shown) and may also have control mechanisms, such as mechanisms to adjust the view, dimensions, color, font, or display characteristics. The processing module 108 may also be coupled to a printer (not shown) to print the output, or a transmission module, such as a DSL line (not shown) or a modem, such as a wireless modem (not shown), to transmit the output to a second location or another display module. This transmission may also be accomplished using a network, such as the Internet, with web browsing capability, or other network of operatively coupled computers, processors, or output devices. One example of a network is shown in FIG. 1 as element 120.

The network 120 is, for example, any combination of linked computers, or processing devices, adapted to transfer (transmit and or receive) and process data. The network 120 may include wireless and wired transmission capabilities. The network 120 may be a private Internet Protocol (IP) network, as well as a public IP network, such as the Internet that can utilize World Wide Web (www) browsing functionality. Alternatively the network 120 may be an Ethernet network, or any two or more operatively coupled processing devices that can share information.

An example of a wired network is a network that uses communication busses and MODEMS, or DSL lines, or a local area network (LAN) or a wide area network (WAN) to transmit and receive data between terminals (such as processor 108 and memory 122). An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems which enables connection to the Internet or other machines that have Wi-Fi functionality. Wi-Fi networks broadcast radio waves that can be picked up by Wi-Fi receivers that are attached to different computers. As shown in FIG. 1, the network 120 is coupled to processing device 108 via wired or wireless bi-directional communication medium 102.

Memory module 122 is an electronic storage medium, such as a server, or other electronic storage repository that can store data used by system 100. The memory module 122 may include, for example, RAM, ROM, EEPROM or other memory media, such as an optical disk, optical tape, CD, or a floppy disk, a hard disk, or a removable cartridge, on which digital information is stored in the form of bits. The memory module 122 is shown as remote memory coupled to processing module 108 via wired or wireless bi-directional communication medium 112.

Figure 2:
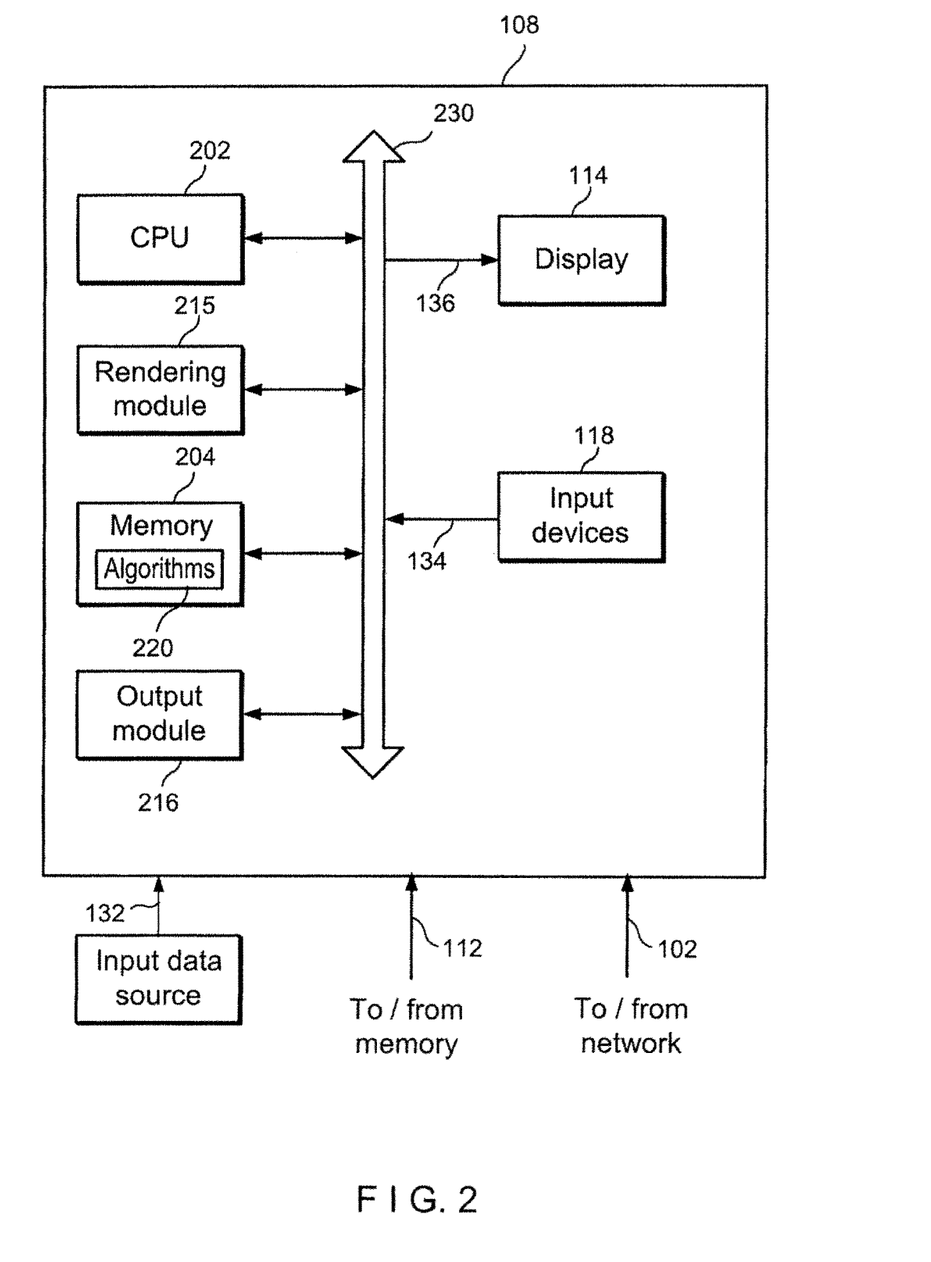
FIG. 2 shows a processing arrangement that may be used with the disclosed technique.

FIG. 2 illustrates a processor module 108 that may be used with the disclosed method. Processor module 108 includes a CPU 202, input/output (I/O) interface 230, memory 204, renderer module 215 and output module 216. Also shown in FIG. 2 are the bi-directional communication media 102, 112 and 132. Display module 114 and input module 118 and associated communication media 136 and 134, respectively, are also shown.

The CPU 202 is typically a processor that includes an arithmetic logic unit (ALU), which performs arithmetic and logical operations, and a control unit (CU), which extracts instructions from memory and decodes and executes them, utilizing the ALU when necessary. I/O interface 230 is used to operatively couple the components of processor module 108.

Memory module 204 is typically an electronic storage medium such as RAM, ROM, EEPROM or other memory device, such as an optical disk, optical tape, CD, or a floppy disk, a hard disk, or a removable cartridge, on which digital information is stored in the form of bits. It may also include recorders to record to and read from mass storage devices such as, for example, optical disks, magnetic disks, flash semiconductor disks, and other types of storage which may be temporary or permanent.

The memory module 204 stores programs, which include, for example, a web browser (not shown), and algorithm memory module 220, as well as typical operating system programs (not shown), input/output programs (not shown), and other programs that facilitate operation of processing device 108.

Memory module, or facility, 204 is used to store image data either received from the detecting unit (shown as element 170 in FIG. 1) or generated by the CPU 202, based on data received from the detecting unit or other source, such as a remote memory (element 122 in FIG. 1), or network (element 120 in FIG. 1). The memory 204 may be accessed in such a way that the contents of the memory are provided to the CPU 202. Once the data has been accessed, typically by program code to fetch, or retrieve, the desired data stored in memory, it may be processed according to one or more algorithms described here.

Algorithm module 220 is used to store algorithms, or series of steps, or program code for implementing the functionality of the disclosed method.

Output module 216 is used to store an output image. The output image may be stored, transmitted, printed, displayed or otherwise utilized. The image is typically a 2-D rendering of volumetric data.

Embodiments of the disclosed method are readily applied, for example, to Maximum Intensity Projection (MIP), which is a display technique that selects the maximum intensity that is encountered along the view angle of the projection. More specifically, a MIP map (sometimes spelled mipmap) is a computer graphics technique used to achieve an illusion of depth in a two-dimensional representation of a three-dimensional (3D) image. The disclosed method may also be used with x-ray imaging in general, CT imaging, PET imaging, and fluoroscopic imaging, which utilize low dose x-rays per image.

As previously noted, chessboard mitigation methods introduce certain localized high frequency loss. Thus, in order to maintain a desired high fidelity of a MIP image the mitigation method should only be applied when the stripe or chessboard artifacts exist. Therefore it is important to detect the artifacts before applying the mitigation algorithms. Thus, the method disclosed herein presents an automatic detection scheme that serves a gate-keeping function, applying the mitigation algorithm only if chessboard or strip artifacts exist in a particular MIP image.

Figure 3A:
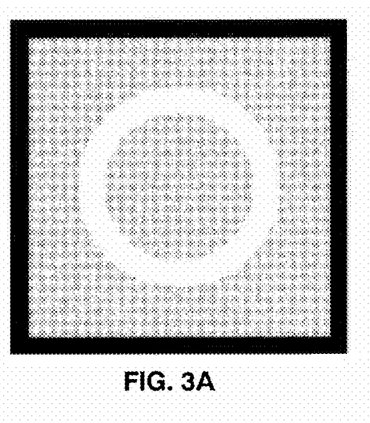
FIG. 3A showing a MIP rendered image with stripe-like patterns, and FIG. 3B showing a MIP rendered image with reduced striping patterns after mitigation.
Figure 3B:
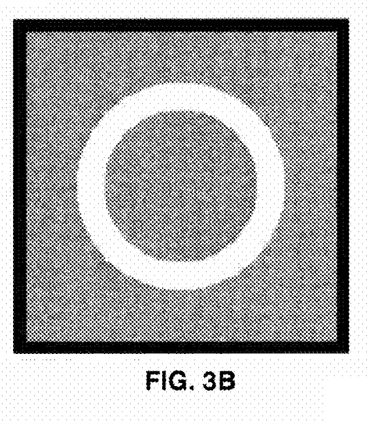

Analysis of the Chessboard Patterns:

In order to determine the nature of the stripe like patterns on MIP rendered images, frequency analysis is performed on the images. FIGS. 3A and 3B show two MIP rendered images. FIG. 3A shows a MIP rendered image showing chessboard stripe-like patterns, while FIG. 3B shows considerably reduced patterns resulting from application of the disclosed artifact mitigation algorithm. Both MIP images have been rendered from synthesized noise-embedded volume data. It should be noted that the MIP images displayed use a very low window level to display low intensity components in the image. Moreover, MIP rendered images of noisy volume data only show stripe artifacts when the viewing direction is along one of the major axes. In the illustrated case, the exemplary MIP images have been rendered with a view direction angle along the Z Axis and a zoom factor of 0.9. Zoom factor is the relation between the sample distance and the voxel distance. The zoom factor typically shows the size of the magnified area shown in the image.

Figure 4A:
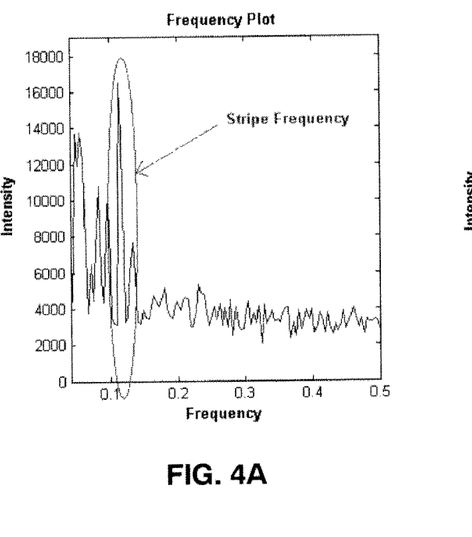
FIG. 4A shows a frequency plot of the image of FIG. 3A showing stripe-like artifacts.
Figure 4B:
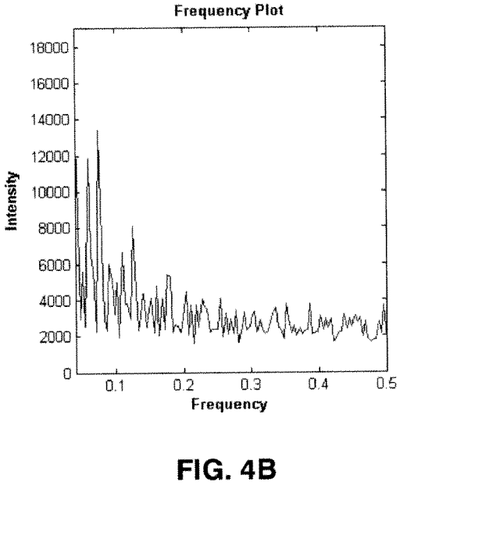
FIG. 4B shows a frequency plot of the image of FIG. 3B showing the mitigated results.

In FIG. 4, the MIP rendered image having stripe artifacts (FIG. 3A) shows a clear spike in the frequency plot indicating the periodic nature of the artifacts. On the other hand, the MIP rendered image produced after applying the mitigation algorithm (FIG. 3B) does not show any such frequency spikes indicating the stripe patterns are not visually perceivable.

The disclosed methods automatically detect the stripe-like (chessboard) artifacts seen in MIP rendered images. As previously noted, the stripe patterns, which are a result of noise variation between rays, are periodic in nature. Moreover, the distance between the stripes (i.e., strip width) changes with the zoom factor.

A simple detection approach method would be to convert the image from the spatial domain to the frequency domain and calculate the stripe frequency. However, for images that contain a number of high and low frequency components, the stripe artifact frequency can very often not be easily distinguished from the neighboring frequency patterns. In order to average out the effects of the neighboring frequency components, one would need to first calculate the average intensity of an image along the rows and columns. Since the stripes are parallel with image row or column, the average of row or column vectors will enhance the stripe artifacts while the other image frequency components related to patient data are smoothened out.

Figure 5A:
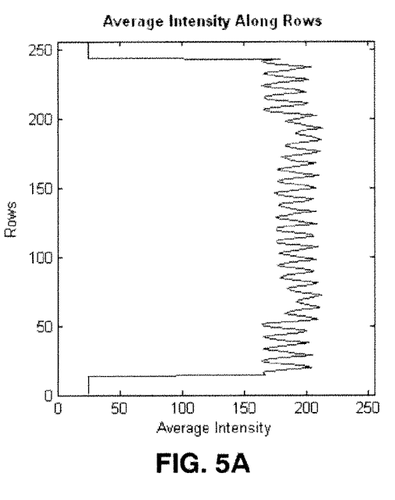
FIG. 5A showing the intensity along rows of the rendered image, and FIG. 5B showing the intensity along columns of the rendered image.
Figure 5B:
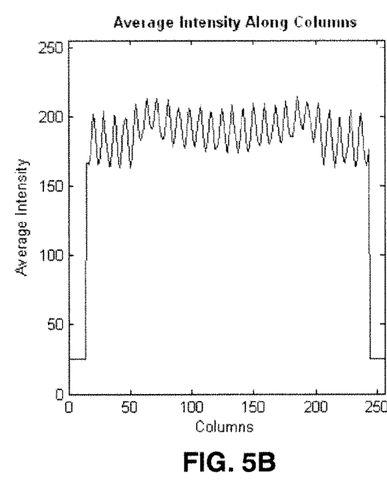

FIGS. 5A and 5B plot the average intensity along the rows and columns of the image shown in FIG. 3A. These graphs clearly show an oscillating pattern existing within the image along the vertical and the horizontal directions.

Figure 6A:
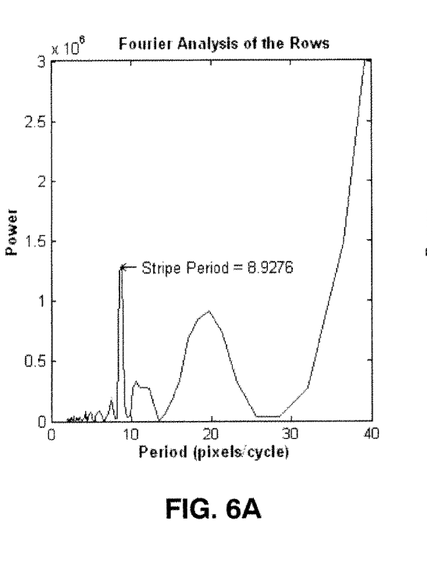
FIGS. 6A and 6B show results of the Fourier analysis of the average intensity along the rows (FIG. 6A) and columns (FIG. 6B) of the data of FIGS. 5A and 5B, respectively.
Figure 6B:
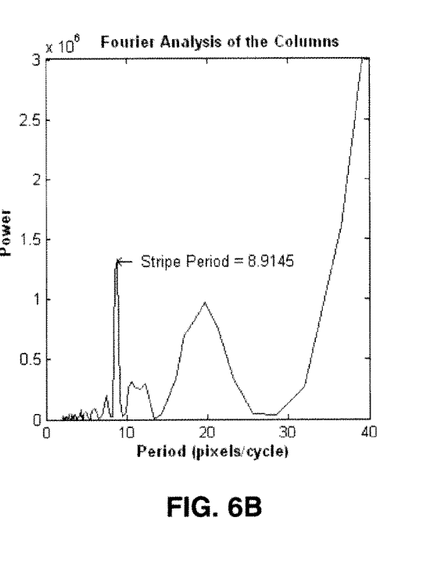

A 1-Dimensional Fourier Transform is then performed to convert the data from the spatial domain to the frequency domain. The resultant power spectrum is plotted against the wavelength period (pixels/cycle) and is shown in FIGS. 6A and 6B. Note that the DC and low frequency components have been removed for better scaling. Once the 1-Dimensional Fourier Transform is performed, the presence of the frequency spike can be determined. For stripe detection, first the stripe period is estimated based on the zoom factor of the rendered image. This provides a window within which the power spectrum may be examined.

The estimated stripe period is calculated in such that:

$$|ESP*ZoomFactor - nint[ESP*ZoomFactor]| \leq \Delta$$

Where,
ESP—Estimated Stripe Period
ZoomFactor—Zoom Factor of the rendered Image
$\Delta$—Delta value, a very small number $\leq 0.1$
nint[ESP*ZoomFactor]—The Product of the Estimated Stripe Period and Zoom Factor rounded to the nearest integer.

The Estimated Stripe Period is the smallest number that satisfies the above equation. Using this estimation, the frequency plot is examined within the window period– EstimateStripePeriod $\pm \Delta_{ESP}$. Maximum power and average power are then calculated within the window period. If the maximum power value is greater than a specified tolerance level, then it is assumed that the stripe pattern exists in the image.

The tolerance or threshold value is calculated as follows:

$$T = k * \text{Avg.Power}$$

Where,

T—Tolerance/threshold value to compare with

AvgPower—Average power computed within the frequency spectrum window, and k—constant that depends upon the Volume dataset, window level of the rendered image, and user specified settings.

The calculated stripe period is the period associated with the maximum power value and represents the distance between two consecutive stripes in pixels.

As an example, in the case for the synthesized volume data, voxel size of the volume data is 1.0×1.0×1.0, the zoom factor is 0.9 and view direction is along the Z-Axis. Hence, the estimated stripe period is estimated as equal to 9 (9*0.9−[9*0.9]−0.1). Now measuring the maximum power within the window period of 9±1 ($\Delta_{ESP}$ taken as 1.0), it is determined that both horizontal and vertical stripe patterns exist, with a stripe period equal to 8.9.

In some images, where the stripe artifacts may be buried by high intensity objects such as bone or dense tissue, the frequency spectrum may not adequately detect the artifacts. In such cases, the volume is rendered again after applying the mitigation algorithm, producing another set of MIP rendered images. The average Row and Column intensity vectors are then calculated for the mitigated rendered images. Next, a correlated difference between the normalized average intensity vectors of the mitigated and the non-mitigated images are computed. The frequency response of the differences are analyzed to detect the stripe pattern.

Figure 7:
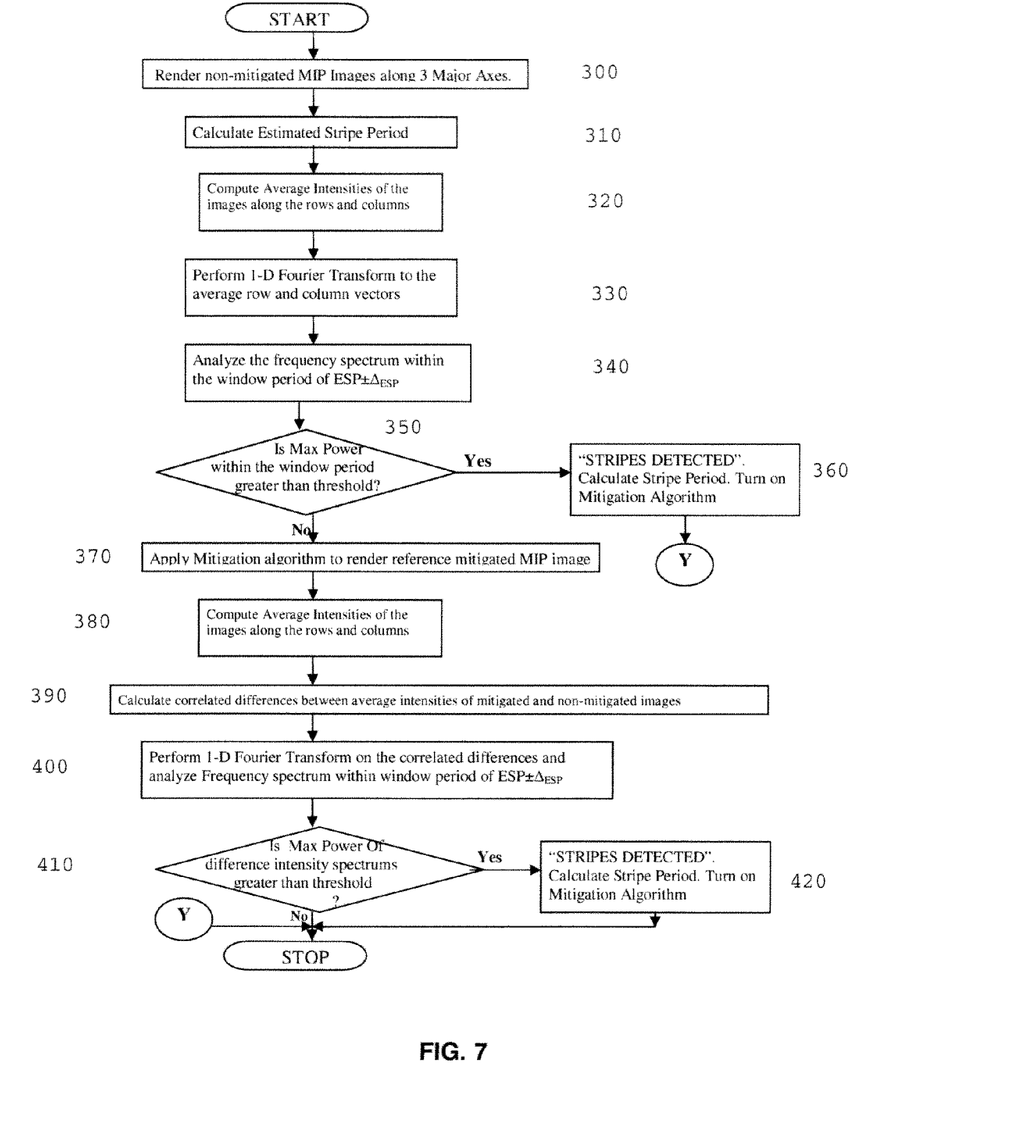
FIG. 7 is a flow chart illustrating the workflow of the disclosed artifact detection algorithm.

The flow chart in FIG. 7 summarizes the workflow of the chessboard detection algorithm (i.e., the Artifact Detection Algorithm). At step 300, non-mitigated MIP images are rendered along 3 major axes. At step 310, the estimated stripe period is calculated. At step 320, average intensities of the images are calculated along the rows and columns. At step 330, a 1-D Fourier Transform is applied to the average row and column vectors. At step 340, the frequency spectrum is analyzed within the window period of ESP±$\Delta_{ESP}$. At step 350, a determination is made as to whether maximum power within the window period is greater than the threshold. If the maximum power within the window period is greater than the threshold, then stripes are detected. At step 360, stripe period is calculated and the Mitigation Algorithm is turned on. The Artifact Detection Algorithm is then complete.

If, however, at step 350, the maximum power within the window period is determined to be less than the threshold, then the Mitigation Algorithm is applied to render reference mitigated MIP images at step 370. At step 380, average intensities of the images are computed along the rows and columns. At step 390, correlated differences are calculated between average intensities of mitigated and non-mitigated images. At step 400, a 1-D Fourier Transform is performed on the correlated differences and the Frequency spectrum is analyzed within the window period of ESP±$\Delta_{ESP}$. At step 410, a determination is made as to whether maximum power of the difference in intensity spectrums is greater than the threshold. If that maximum power is greater than the threshold, then stripes are detected, stripe period is calculated at step 420, and the Mitigation Algorithm is turned on. If, however, the maximum power of the difference in intensity spectrums is less than the threshold, then stripes are not detected and the Artifact Detection Algorithm is complete (and the Mitigation Algorithm is not turned on).

Results:

The chessboard detection algorithm was tested on two additional MIP rendered Images.

Figure 8A:
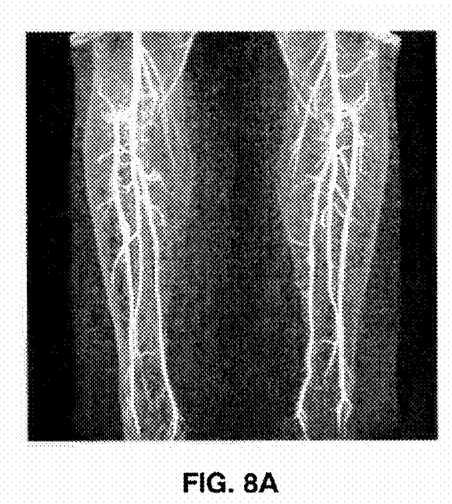
FIG. 8A shows an MR Leg MIP having stripe like patterns.
Figure 8B:
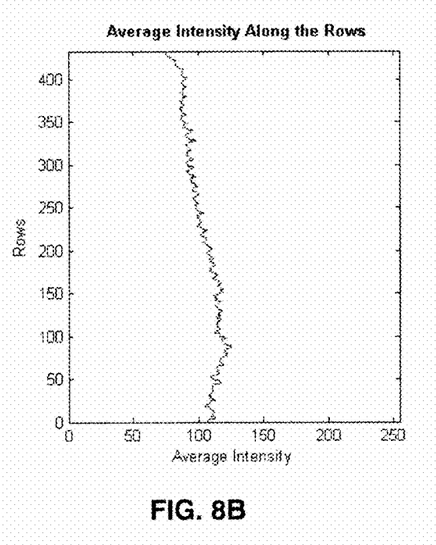
FIG. 8B shows average intensity along the rows of the image.
Figure 8C:
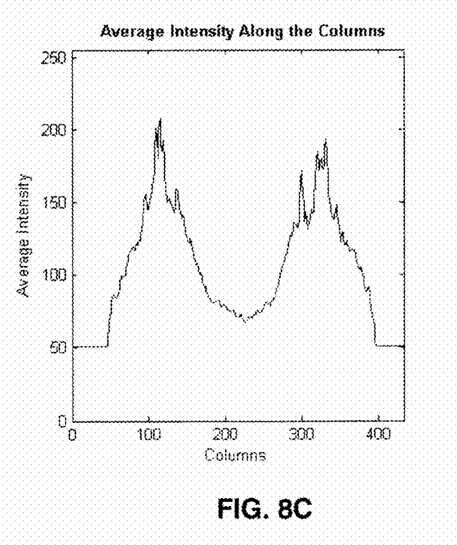
FIG. 8C shows average intensity along the columns of the image.
Figure 8D:
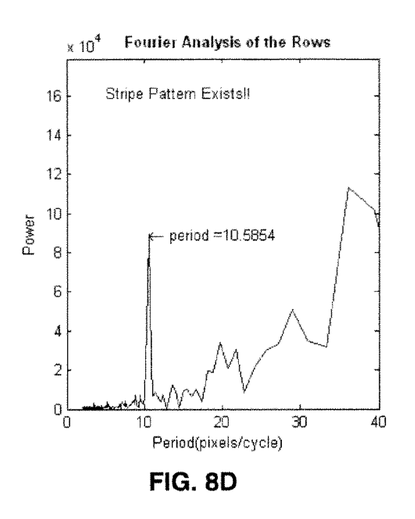
FIG. 8D shows the results of a Fourier analysis along the rows.
Figure 8E:
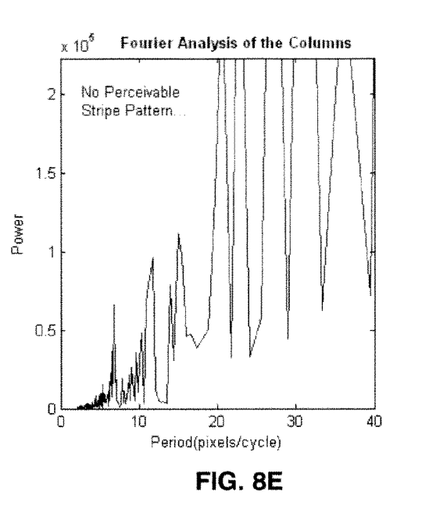
FIG. 8E shows the results of Fourier analysis along the columns.
Figure 8F:
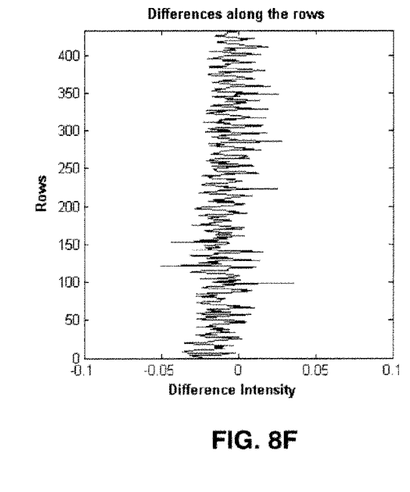
FIG. 8F shows correlated differences of normalized average intensities along the rows.
Figure 8G:
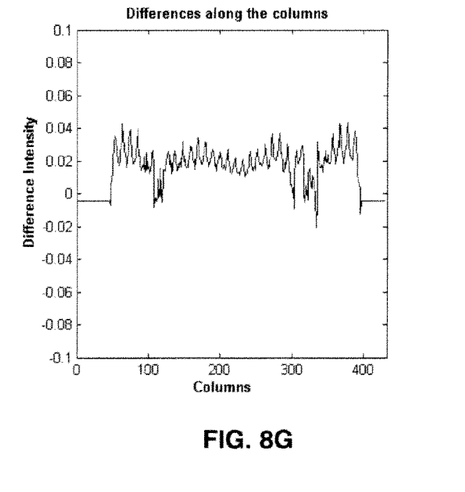
FIG. 8G shows correlated differences of normalized average intensities along the columns.
Figure 8H:
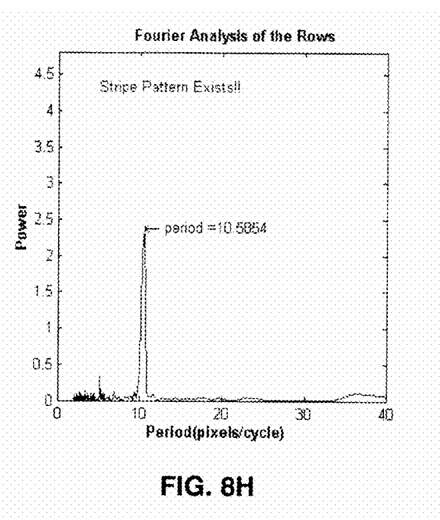
FIG. 8H shows the results of Fourier analysis of the correlated differences along the rows.
Figure 8I:
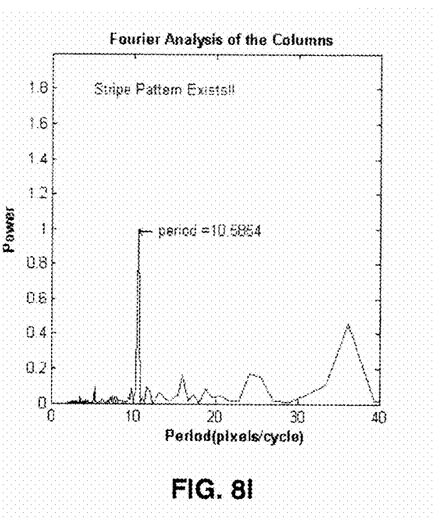
FIG. 8I shows the results of Fourier analysis of the correlated differences along the columns.
Figure 9A:
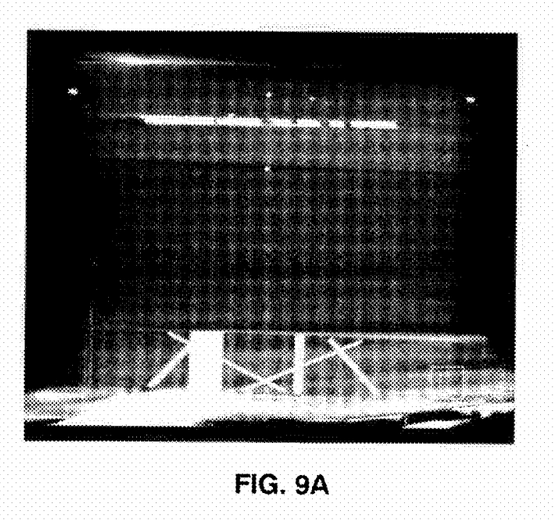
FIG. 9A shows a phantom MIP image in which stripe-like patterns are visible.
Figure 9B:
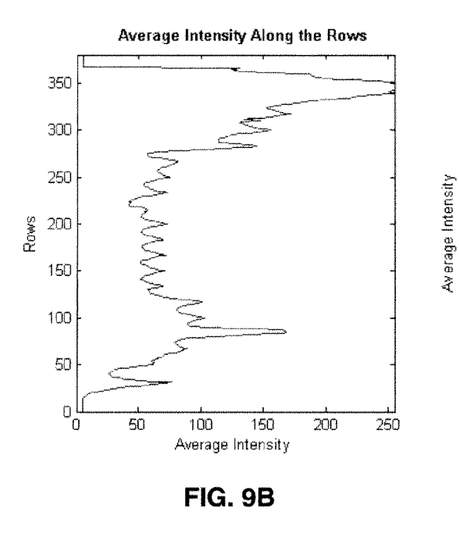
FIG. 9B shows average intensity along the rows.
Figure 9C:
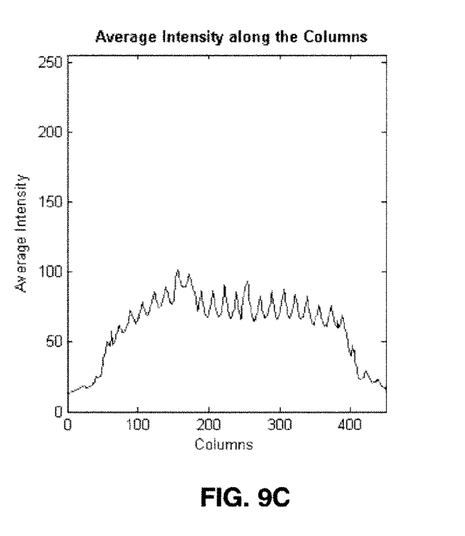
FIG. 9C shows average intensity along the columns.
Figure 9D:
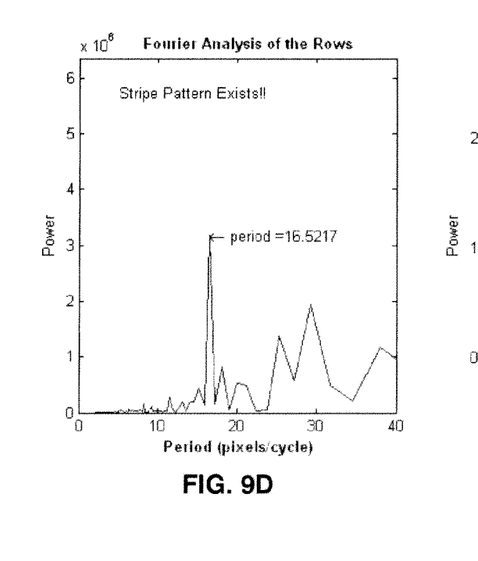
FIG. 9D shows the results of a Fourier analysis along the rows.
Figure 9E:
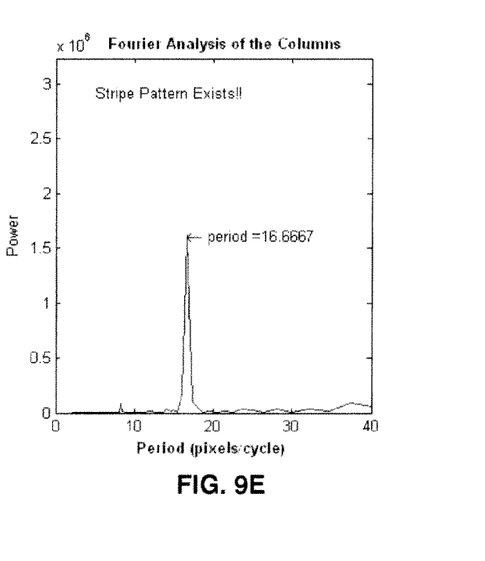
FIG. 9E shows the results of a Fourier analysis along the columns.

FIGS. 8A-8E show the application of the detection algorithm on the MIP image of an exemplary MR Leg Dataset. The image of FIG. 8A shows a perceivable pattern of stripes along the horizontal direction. The first stage of the detection algorithm reveals strong horizontal stripe like patterns and indistinguishable vertical patterns. At the next stage, the correlated difference of the normalized average intensities in both the rows and columns are computed. When a frequency transform is performed on these differences, the analysis reveals stripe pattern artifact detection in both the horizontal and vertical directions. This is shown in FIGS. 8F-8I. FIGS. 9A-9E show the result of the detection algorithm on the phantom MIP rendered image. FIGS. 9D and 9E detect the presence of strong horizontal and vertical stripe patterns.

The features of the system and technique have been disclosed, and further variations will be apparent to persons skilled in the art. All such variations are considered to be within the scope of the appended claims. Reference should be made to the appended claims, rather than the foregoing specification, as indicating the true scope of the subject system and technique.

What is claimed is:

1. A computer-implemented method for identifying and eliminating chessboard artifacts in MIP images, comprising:

accessing volumetric data representative of a medical image volume, the volumetric data having random noise;

forming a 3-D voxel grid from the volumetric data;

rendering non-mitigated MIP images of the volumetric data along three major axes;

calculating an estimated stripe period (ESP) based on a zoom factor of the rendered images;

computing average row and column vectors by calculating the mean of each row and column of each MIP image, respectively;

performing a 1D Fourier transform on average row vectors and average column vectors;

analyzing the resulting frequency spectrum within a predetermined window period to determine if a maximum power within the predetermined window period is greater than a threshold value, wherein the predetermined window period is based on the ESP; and identifying the MIP image as containing a chessboard artifact if the maximum power is greater than the threshold value.

2. The computer-implemented method of claim 1, wherein if the maximum power within the predetermined window period is not greater than the threshold value, performing the following steps:

applying the mitigation algorithm to render reference-mitigated MIP images of the volume data along three major axes;

computing average row and column vectors by calculating the mean of each row and column of each reference-mitigated MIP image, respectively;

calculating correlated differences between average row and column intensities of the mitigated and non-mitigated MIP images;

performing a 1-D Fourier transform on the correlated differences and analyzing the frequency spectrum within the predetermined window period;

analyzing whether a maximum power of the difference in intensity spectrums is greater than the threshold value; and identifying the MIP image as containing a chessboard artifact if the difference in intensity spectrums is greater than the threshold value.

3. The computer-implemented method of claim 2, further comprising:
  applying a mitigation algorithm only to those volumes whose MIP images were identified as containing a chessboard artifact, the mitigation algorithm eliminating the chessboard or stripe artifacts from the image.

4. The computer-implemented method of claim 3, further comprising displaying the rendered MIP image to a user.

5. The computer-implemented method of claim 1, wherein the analyzing step comprises:
  determining a maximum power and an average power within the predetermined window period; and
  determining whether the maximum power within the predetermined period is greater than the threshold value.

6. The computer-implemented method of claim 1, wherein the mitigation algorithm comprises a ray casting method.

7. The computer-implemented method of claim 1, wherein the identifying step is performed separately for each of the MIP images along the three major axes.

8. A system for identifying and eliminating chessboard artifacts in MIP images, comprising:
  means for accessing volumetric data representative of a medical image volume, the volumetric data having random noise;
  means for forming a 3-D voxel grid from the volumetric data;
  means for rendering non-mitigated MIP images of the volumetric data along three major axes;
  means for calculating an estimated stripe period (ESP) based on a zoom factor of the rendered images;
  means for computing average row and column vectors by calculating the mean of each row and column of each MIP image, respectively;
  means for performing a 1D Fourier transform on average row vectors and average column vectors;
  means for analyzing the resulting frequency spectrum within a predetermined window period to determine if a maximum power within the predetermined window period is greater than a threshold value, wherein the predetermined window period is based on the ESP; and
  means for identifying the MIP image as containing a chessboard artifact if the maximum power is greater than the threshold value.

9. The system of claim 8, wherein if the maximum power within the predetermined window period is not greater than the threshold value, providing the following:
  means for applying the mitigation algorithm to render reference-mitigated MIP images of the volume data along three major axes;
  means for computing average row and column vectors by calculating the mean of each row and column of each reference-mitigated MIP image, respectively;
  means for calculating correlated differences between average row and column intensities of the mitigated and non-mitigated MIP images;
  means for performing a 1-D Fourier transform on the correlated differences and analyzing the frequency spectrum within the predetermined window period;
  means for analyzing whether a maximum power of the difference in intensity spectrums is greater than the threshold value; and
  means for identifying the MIP image as containing a chessboard artifact if the difference in intensity spectrums is greater than the threshold value.

10. The system of claim 9, further comprising:
  means for applying a mitigation algorithm only to those volumes whose MIP images were identified as containing a chessboard artifact, the mitigation algorithm eliminating the chessboard or stripe artifacts from the image.

11. The system of claim 10, further comprising means for displaying the rendered MIP image to a user.

12. The system of claim 8, wherein the means for analyzing comprises means for determining a maximum power and an average power within the predetermined window period; and means for determining whether the maximum power within the predetermined period is greater than the threshold value.

13. The computer-implemented method of claim 8, wherein the mitigation algorithm comprises a ray casting method.

14. The computer-implemented method of claim 8, wherein the identifying step is performed separately for each of the MIP images along the three major axes.

15. A non-transitory machine readable storage device tangibly embodying a series of instructions executable by the machine to perform a series of steps, the steps comprising:
  accessing volumetric data representative of a medical image volume, the volumetric data having random noise;
  forming a 3-D voxel grid from the volumetric data;
  rendering non-mitigated MIP images of the volumetric data along three major axes;
  calculating an estimated stripe period (ESP) based on a zoom factor of the rendered images;
  computing average row and column vectors by calculating the mean of each row and column of each MIP image, respectively;
  performing a 1D Fourier transform on average row vectors and average column vectors;
  analyzing the resulting frequency spectrum within a predetermined window period to determine if a maximum power within the predetermined window period is greater than a threshold value, wherein the predetermined window period is based on the ESP; and
  identifying the MIP image as containing a chessboard artifact if the maximum power is greater than the threshold value.

16. The non-transitory machine readable storage device of claim 15, wherein if the maximum power within the predetermined window period is not greater than the threshold value, comprising instructions for performing the following steps:
  applying the mitigation algorithm to render reference-mitigated MIP images of the volume data along three major axes;
  computing average row and column vectors by calculating the mean of each row and column of each reference-mitigated MIP image, respectively;
  calculating correlated differences between average row and column intensities of the mitigated and non-mitigated MIP images;
  performing a 1-D Fourier transform on the correlated differences and analyzing the frequency spectrum within the predetermined window period;
  analyzing whether a maximum power of the difference in intensity spectrums is greater than the threshold value; and
  identifying the MIP image as containing a chessboard artifact if the difference in intensity spectrums is greater than the threshold value.

17. The non-transitory machine readable storage device of claim 16, further comprising instructions for:
  applying a mitigation algorithm only to those volumes whose MIP images were identified as containing a chessboard artifact, the mitigation algorithm eliminating the chessboard or stripe artifacts from the image.

18. The non-transitory machine readable storage device of claim 17, further comprising instructions for displaying the rendered MIP image to a user.

19. The non-transitory machine readable storage device of claim 15, wherein the analyzing step comprises:
   determining a maximum power and an average power within the predetermined window period; and
   determining whether the maximum power within the predetermined period is greater than the threshold value.

20. The non-transitory machine readable storage device of claim 15, wherein the identifying step is performed separately for each of the MIP images along the three major axes.

* * * * *